Dec. 26, 1967  ASAHIKO GOTO  3,360,010
HIGH ANTICORROSIVE METAL LINING STRUCTURE
Filed Aug. 9, 1963
Fig. 1
Fig. 2
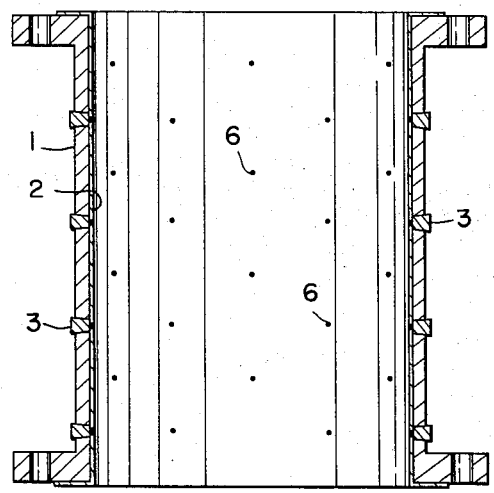
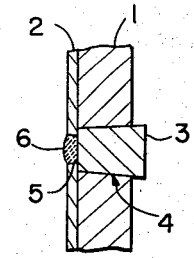
Fig. 3  Fig. 4  Fig. 5
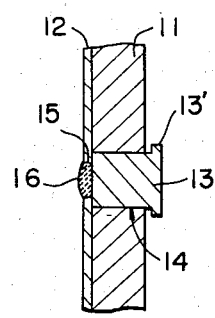
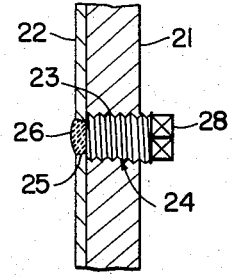
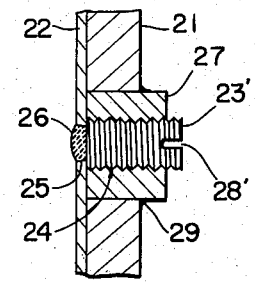
INVENTOR.
ASAHIKO GOTO.
BY
ATTORNEY.

United States Patent Office 3,360,010
Patented Dec. 26, 1967

3,360,010
HIGH ANTICORROSIVE METAL LINING STRUCTURE
Asahiko Goto, Nada-ku, Kobe, Japan, assignor to Kobe Steel Works, Ltd., Fukiai-ku, Kobe, Japan
Filed Aug. 9, 1963, Ser. No. 301,115
Claims priority, application Japan, Aug. 15, 1962, 37/46,754
4 Claims. (Cl. 138—142)

This invention relates to a special structure for fixing with ease and accuracy such high class anti-corrosive metal as titanium, zirconium and tantalum etc. which cannot be welded with metals of different kind as lining to various kinds of machines and pipes for which corrosive liquid is used, and the characteristic thereof lies in that plugs are made of the same material as the lining material, holes are made in the body of the machine to be lined into which the above-mentioned plugs are to be inserted, the plugs are inserted and fixed so as they may be prevented from penetrating into the body and welding holes are made in the lining board at positions in agreement with said plug-holes thereby combining one solid body by padding-welding the inside end surface of the plugs inserted into the above-mentioned plug-holes with the lining plate at the welding holes from the surface of the inside circumference of the lining plate and obtaining a lining structure made up of anti-corrosive metal which is especially perfect against negative pressure and never causes leakage or corrosion as in the case of stopping by means of screws.

Explanation will be made as follows with respect to the examples of working this invention by referring to figures.

FIG. 1 is the vertical section of the central part of the lining structure relating to this invention and FIGS. 2 to 5 inclusive show the enlarged section of the connected part of the body with the lining plate. In FIG. 1 and FIG. 2, 1 is the body of a machine, tool or pipe in cylindrical shape or in the shape of vessel consisting of soft steel or stainless steel. 2 is the lining plate made of high class anti-corrosive metals such as titanium, zirconium or tantalum etc. to be lined in contact with the surface of the inside circumference of said body, 3 is the plug in the shape of frustrum made of the same quality of material as lining plate 2 and 4 is the plug-hole of the same shape as plug 3 provided in body 1 at the position where lining plate is to be combined. And this plug-hole 4 is made so as the part of less diameter thereof faces further inside. 5 is the padding hole made in the shape desired in lining plate 2 at the position connected with plug-hole 4 and by padding 6 into it lining plate 2 and metal of the same kind, lining plate 2 and plug 3 are welded into one body as lining.

FIG. 3 shows another example of this invention. 11 shows the body of machine, tool or pipe in the shape of cylinder or vessel, 12 lining plate of such high class anti-corrosive metal as titanium, zirconium or tantalum etc. to be lined in contact with the inside surface of the body 11, 13 the plug making one body with its brim made of the same quality of material as the above-mentioned lining plate 12, 14 the plug-hole bored in body 11 at the position where the lining plate is to be combined and 15 is the padding-melt hole bored in the shape desired in lining plate 12 at the position where same communicates with plug-hole 14 and by padding-welding 6 thereto a suitable metal for welding lining plate 12 and plug 13 into one body from the inside circumference of the lining plate, body 11 and lining plate 12 are welded into one body at the suitable as well as necessary spot to be made as lining.

FIG. 4 and 5 show another example of this invention. 21 shows the body of machine, tool or pipe in the shape of a cylinder or vessel, 22 lining plate made of such super-anticorrosive metals as titanium, zirconium or tantalum etc. to be lined in contact with the inside surface of body 21 and 23 shows a screw made of the same quality of material as the above-mentioned lining plate 22 with male screw threads 24 provided on the outer circumference. And at the desirable position for combining lining plate 22, a screw hole which meets with the male screw threads 24 of screw 23 is provided in advance in body 21. 25 is the padding hole bored in lining plate 22 in the shape desired at the position where same communicates with the inside end of screw 23 which has been fitted to this screw-hole and by padding 26 thereto such metal as is suitable for welding lining plate 22 and screw 23 into one body from the inside circumference of lining plate, lining is completed. And it is also possible, instead of providing screw-hole directly in body 21, to weld 29 with body 21 by closely inserting reinforcing boss 27 made of metal of the same quality of material as body into the hole bored through body 21 and meet screw 23' to the female screw threads grooved on the inside circumference of this reinforcing boss 27, as shown in FIG. 7.

In both of the above-mentioned cases, for securing screw into body 21, it is convenient either to provide revolving nut 28 by fitting box spanner to the outer end of screw 23 as shown in FIG. 6 or to provide, in place of the nut, grooves for inserting driver to the outside end of screw 23' to be used for turning the screw.

Stainless steel, nickel, Monel and Hastelloy which can be welded with different kinds of metals can be welded and firmly fixed to shell by applying strip lining thereto, but as titanium, zirconium and tantalum or the basic alloy thereof cannot be welded with a body consisting of a different kind of metal, special structure for fixing lining is necessary for these metals. Especially in case where working pressure is likely to become negative, the negative pressure affects directly upon the lining, resulting in the fatal defect of causing transformation or distortion therein.

In this invention, however, combining means using screws is not used as stated above, but a hole is provided at the position where lining plate of high anti-corrosive metal is to be combined and after firmly inserting into this hole a plug of the same quality of material as lining plate, a metal capable of welding the plug and lining plate is welded, from the surface of the inside circumference of the lining plate, to the padding welded hole in the lining plate which has been bored so as to communicate with the surface of the inner end of said plug, thereby effecting combination into one body. Therefore, the inside surface wholly becomes the lining of the above-mentioned high anti-corrosive metals eliminating the cause of corrosion due to leakage of liquid and has no defect of causing local transformation or distortion if negative pressure should arise as in the case of using screws.

Especially, anti-corrosive lining plate which is impossible to be welded with the body has been welded into one body while being closely lined thereto by padding-welding with the plug of the same quality of material as the body. Therefore, it is of course a very simple and easy job to fix the lining plate and because the contact of the plug with the plug-hole becomes stronger in proportion to negative pressure, this lining plate can be guaranteed for use for a long period of time with safety.

What is claimed is:
1. A metal structure made of a metal which cannot be welded to titanium, zirconium, or tantalum, said metal structure being lined with an anti-corrosive liner of titanium, zirconium, or tantalum, a plurality of plugs of the respective metal of the liner having the shape of a frustrum and mounted in holes in the metal structure having a corresponding shape, the smallest diameter of the holes in the metal structure being located adjacent the liner, the plugs contacting the metal liner, the liner having a plurality of welding holes therethrough, each welding hole aligned with and communicating with the inner end of a plug, the liner being weldingly attached to the plugs by a padding-weld of the respective metal of the liner and plug in the welding holes of the liner, whereby the liner is securely mounted to the metal surface.

2. The metal structure of claim 1 wherein the plugs are mounted in holes defined by reinforcing metal bosses weldingly attached to the metal structure.

3. A metal structure made of a metal which cannot be welded to titanium, zirconium, or tantalum, said metal structure being lined with an anti-corrosive liner of titanium, zirconium, or tantalum, a plurality of plugs of the respective metal of the liner mounted in plug holes in the metal structure and contacting the liner, the plugs having brims seated against the surface of the metal structure opposite the liner, the liner having a plurality of welding holes therethrough, each welding hole aligned with and communicating with the inner end of a plug, the liner being weldingly attached to the plugs by a padding-weld of the respective metal of the liner and plug in the welding holes of the liner, whereby the liner is securely mounted to the metal surface.

4. The metal structure of claim 3 wherein the plugs are mounted in holes defined by reinforcing metal bosses weldingly attached to the metal structure.

References Cited

UNITED STATES PATENTS

| | | | |
|---|---|---|---|
| 329,217 | 10/1885 | Ritter et al. | 29—470.5 X |
| 1,407,202 | 2/1922 | Kubler. | |
| 2,108,409 | 2/1938 | Peron | 29—480 |
| 2,619,817 | 12/1952 | Leaton | 29—470.5 X |
| 2,999,703 | 9/1961 | Myers | 29—526 X |
| 2,054,939 | 9/1936 | Larson | 138—142 |

LAVERNE D. GEIGER, *Primary Examiner.*

B. KILE, *Assistant Examiner.*